United States Patent

[11] 3,575,637

| [72] | Inventors | Roland L. Krieger;<br>Gary J. Drinan, Milwaukee, Wis. |
|---|---|---|
| [21] | Appl. No. | 831,582 |
| [22] | Filed | June 9, 1969 |
| [45] | Patented | Apr. 20, 1971 |
| [73] | Assignee | Allen-Bradley Company<br>Milwaukee, Wis. |

[54] GATE-CONTROLLED PHASE FAILURE PROTECTION CIRCUIT
1 Claim, 1 Drawing Fig.

[52] U.S. Cl............................................. 317/13,
307/207, 307/216, 317/41, 317/46, 317/47,
317/123
[51] Int. Cl..................................................... H02h 7/09
[50] Field of Search.......................................... 317/46, 13,
47, 41, 48, 123 (SSL); 307/207, 216

[56] References Cited
UNITED STATES PATENTS
| 3,155,880 | 11/1964 | Salina............................ | 317/46 |
| 3,188,529 | 1/1965 | Byrnes et al. ................. | (317/123SSL) |
| 3,255,380 | 1/1966 | Atkins et al................... | (317/123SSL) |

Primary Examiner—James D. Trammell
Attorneys—Allan W. Leiser and Arthur H. Seidel ABSTRACT: A protective circuit for a polyphase load includes a bypass device which, when actuated, serves to open the load circuit and a trigger circuit for the bypass device. A phase failure-responsive control gate for the trigger circuit includes an exclusive OR gate interposed in the trigger circuit and separate signal transformers, one associated with each of the phases to provide a signal when the associated phase is operative, the transformers serving as inputs to the exclusive OR gate. Because of the exclusive OR gate an actuating signal is provided by the trigger circuit for the bypass device when less than all of the phases are operative but not when none or all of them are operative.

PATENTED APR 20 1971     3,575,637
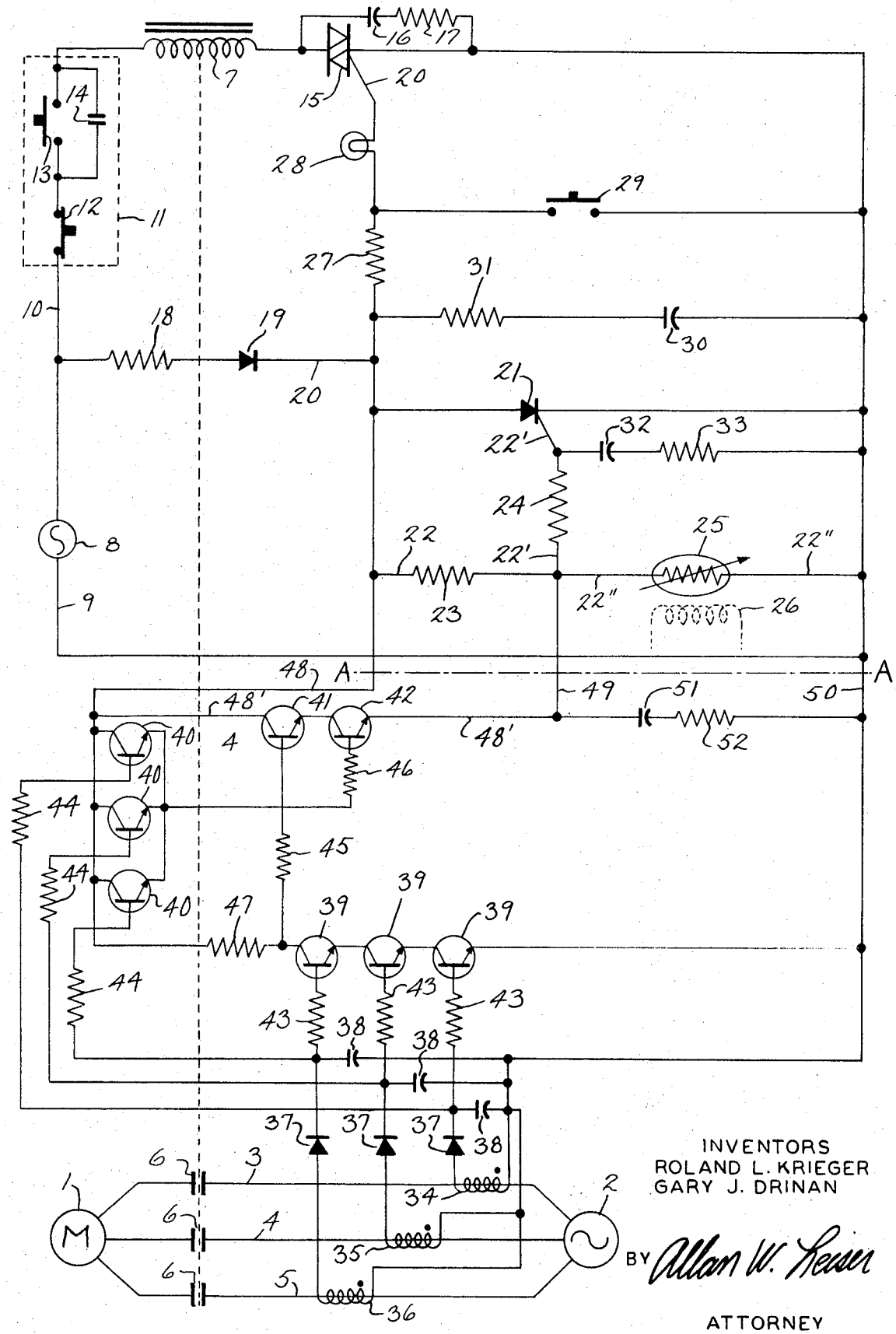
INVENTORS
ROLAND L. KRIEGER
GARY J. DRINAN
BY Allan W. Leiser
ATTORNEY

GATE-CONTROLLED PHASE FAILURE PROTECTION CIRCUIT

BACKGROUND OF THE INVENTION

This invention relates to protective circuits for polyphase loads such as three phase electric motors, and more particularly to a protective circuit which is operative to open the load circuit in the event of a phase failure. It is of course very important to protect against a failure in one or more phases to prevent an unbalanced condition which could result in serious damage. While various phase failure protection circuits have been devised in the past, none is entirely satisfactory.

SUMMARY OF THE INVENTION

It is the object of this invention to provide an improved phase failure-responsive protection circuit including separate signal transformers for each of the phases and an exclusive OR gate so that the circuit as a whole has an output when less than all of the phases are operative but not when none or all of them are operative. It is a specific object to provide a circuit of this type incorporating solid state components, and further objects include providing a circuit that is highly effective and dependable but relatively simple and inexpensive. Still other objects and advantages will appear from the description to follow.

BRIEF DESCRIPTION OF THE DRAWING

FIG. 1 is a schematic electrical circuit diagram of a motor protection circuit incorporating a phase failure protection circuit constituting a preferred embodiment of the invention.

DESCRIPTION OF THE PREFERRED EMBODIMENT

The portion of the circuit shown above the line A–A in FIG. 1 constitutes an overload protection circuit substantially the same as that described and claimed in the copending application of Anthony C. Pfister et al., Ser. No. 772,168, filed Oct. 31, 1968, for "Thermistor Controlled Overload Protection Circuit." It is a particular feature of this invention that the contemplated phase failure protection circuit can be used in conjunction with the basic circuit of that invention.

The basic function of the overload circuit is to protect a three phase motor 1 which is connected to a three phase source 2 by lines 3, 4 and 5 which together constitute a load circuit. Protective control is accomplished through normally open line contacts 6 which are connected in the lines 3, 4 and 5 and which are controlled by an electromagnetic coil 7 which is included in the basic protective circuit. The overall system operates in conventional fashion in that the contacts 6 are closed when the coil 7 is picked up so as to complete the load circuit, and they open to break the load circuit in response to dropping out of the coil 7.

The coil 7 is connected across an AC source 8 by means of lines 9 and 10 which together constitute an operating circuit for the coil 7. A conventional start-stop station 11 is connected in series with the coil 7 and includes a normally closed stop switch 12, a normally open start switch 13, and normally open auxiliary contacts 14 which are connected across the switch 13 and which close in response to picking up of the coil 7 in usual fashion to give a latching action.

A triac 15 is connected in the line 10 to be in series with the coil 7 to serve as a main or power gating device. A triac is basically a solid state, bidirectional AC switch which requires an actuating signal input in order to be conductive. Thus when the triac 15 receives an actuating or trigger signal of sufficient magnitude it acts as a closed switch and allows the coil 7 to pick up. When the actuating signal to the triac 15 is reduced below the necessary magnitude, however, it acts as an open switch and the coil 7 drops out. A capacitor 16 and resistor 17 are connected across the triac 15 to provide transient protection and help to eliminate spurious triggering.

A resistor 18 and diode 19 are connected to the operating circuit for the coil 7 and together constitute a DC signal supply means. A signal output line 20 leads from the diode 19 to the gate of triac 15, and under normal conditions conducts an actuating signal of sufficient magnitude therefore. The resistor 18 and diode 19 constitute a particularly convenient satisfactory DC source, but alternative sources can be used, such as a signal transformer connected across the AC source 8 with its output connected to a rectifier network, all as specifically shown in the said copending application of Pfister et al., Ser. No. 772,168.

A silicon controlled rectifier 21 is connected to be in shunt or bypass relationship with the signal output line 20. A silicon controlled rectifier is a unidirectional, bistable, solid state switch which also requires an actuating or trigger signal to be conductive. An actuating circuit for the SCR 21 includes a main branch 22, a trigger branch 22' which leads to the gate of the SCR 21, and a control branch 22''. A fixed value resistor 23 is connected in the main branch 22, and another resistor 24 of fixed value is connected in the trigger branch 22'. Connected in the control branch 22'', however, is a thermistor 25 which has a positive temperature coefficient of resistance so that its resistance value increases in response to an increase in its temperature. The thermistor 25 is positioned in conventional fashion to be in a heat transfer relationship with a heater coil 26 which serves as an overload indicator. The coil 26 would of course usually be connected in series with the motor 1 which is being protected, and more than one coil 26 might be used, but only one coil in broken lines has been shown for the sake of simplicity.

A bias resistance 27 and a signal lamp 28, which also serves as a current limiting resistance, are both connected in the signal output line 20. A normally open reset switch 29 is connected to the line 20 to be in shunt relationship with both the line 20 and the SCR 21. A first filter capacitor 30 is connected to the line 20 and is in series with a resistor 31 which prevents overly rapid discharge thereof, and a second filter capacitor 32, with a protective resistor 33, is connected to the trigger branch 22'.

The circuit as thus far described is essentially similar to that shown and claimed in the aforementioned application of Pfister et al., Ser. No. 772,168, and functions in the same manner. Under normal operating conditions, the signal output line supplies an actuating signal to the triac 15 that is of sufficient magnitude to cause the triac to be conductive, as a result of which the operating circuit for the coil 7 is completed. Under normal conditions, the thermistor 25 is at a normal low temperature or "cool" and has a relatively low resistance value. The resistance value of the thermistor 25 and the values of the resistors 23 and 24 are selected so that under normal conditions the SCR 21 is not supplied with a trigger signal of sufficient magnitude to cause it to be conductive, and as a result it acts as an open switch. In the event of an overload, however, which results in heating of the coil 26, the thermistor 25 is heated and its resistance value then increases. This increase in resistance value effectively increases the magnitude of the trigger signal delivered to the SCR 21 and at a preselected point this signal value will be sufficient to cause the SCR 21 to become conductive. When it becomes conductive, the SCR 21 acts as a closed switch and effectively shunts the signal output line 20 to reduce the magnitude of the actuating signal to the triac 15 to the point where the triac 15 turns off. This breaks or opens the operating circuit for the coil 7, which in turn causes the contacts 6 to open. The triac 15 can thus be said to be a power gating device with respect to the coil 7, and the SCR 21 serves as a bypass device the triggering of which in effect causes an opening of the three phase load circuit for the motor 1.

Resetting of the basic circuit is accomplished by closing the switch 29. Assuming that the thermistor 25 has been cooled sufficiently—to the point where its resistance value is normal—closing of the switch 29 will effectively shunt both the trigger and conduction current of the SCR 21 causing it to turn off. Upon subsequent release of the switch 29, the SCR 21, being a bistable device, will remain off and an actuating signal of sufficient magnitude will again be supplied to the triac 15 whereupon the operating circuit can be reactivated by means of the start switch 13. If the thermistor 25 has not cooled sufficiently, however, the operation is somewhat different and the bias resistance 27 then serves to prevent an undesirable transitory reactuation. The bias resistance 27 is in the circuit of the switch 29, and insures that there will be a minimum holding current in both the trigger circuit and the conduction circuit for the SCR 21. The value of the resistance 27 is selected in conjunction with the values of the other components so that if the switch 29 is closed while the thermistor 25 is still at the high resistance value, the total trigger and conduction current for the SCR 21 will be sufficient to keep it turned on so that the actuating signal for the triac 15 will continue to be shunted. Without this protection, the SCR 21 would be shunted immediately upon closing of the switch 29, and upon release of the switch 29 it would not be turned on again for a few cycles. If the start switch 13 had for some reason been closed during this period, the triac 15 would be turned on briefly allowing a surge that could cause momentary operation of the motor 1 with resulting injury or damage.

The indicator light 28 serves to indicate the state of the protective circuit, and is on when a signal of sufficient magnitude is being supplied to the triac 15.

The basic overload circuit shown is particularly advantageous in that having the overload sensing means, the coil 26 and thermistor 25, acting in effect on the SCR 21—which is interposed between these means and the triac 15—eliminates marginal operation or chattering which might result if the overload sensing means acted more directly on the triac 15. As will be apparent to those skilled in the art, however, this particular circuit is not absolutely necessary to the phase failure protection circuit contemplated herein, and the phase failure circuit could be used with any basic protective circuit incorporating a bypass device which when triggered serves to open a load circuit.

The phase failure responsive portion of the circuit is primarily below the line A-A in FIG. 1. It includes three separate conventional current transformers 34, 35 and 36 which are operatively associated, respectively, with the lines 3, 4 and 5. The outputs of the transformers 34, 35 and 36 are connected to respective diodes 37 and capacitors 38 so that each transformer serves as a signal means providing a DC output signal when current is being conducted in its associated line 3, 4 or 5, or in other words when its respective associated phase is operative.

The circuit further includes a first set of three transistors 39 which are connected in series, a second set of three transistors 40 which are connected in parallel, and a set of two transistors 41 and 42 which are connected in series, all of the transistors 39, 40 and 41 and 42 being of conventional construction and operation. As will be apparent to those skilled in the art, the output of each of the transformers 34, 35 and 36 is adapted to trigger one of the transistors 39 and one of the transistors 40. As will also be apparent and as will be discussed more fully below, the transistors 39 are adapted to control the triggering of the transistor 41 and the transistors 40 are adapted to control the triggering of the transistor 42.

The control circuit further includes resistors 43 in the base circuit for the transistors 39, resistors 44 in the base circuits for the transistors 40, a resistor 45 in the base circuit for the transistor 41, a resistor 46 in the base circuit for the transistor 42, and a resistor 47. All of these resistances 43—47 serve to protect the circuit components as will be understood by those skilled in the art, and they are not necessary to the invention per se.

Lines 48, 49 and 50 connect the several transistors and associated elements with the basic circuit. The lines 48—50, with a line 48' which passes through the transistors 41 and 42, and with the diode 19, line 20, line 22' and associated elements and lines, establish a trigger circuit adapted to supply an actuating signal to the SCR 21. As will be apparent to those skilled in the art, whenever the transistors 41 and 42 are conductive, an actuating signal will be supplied. A capacitor 51 and resistor 52 are connected across the lines 49 and 50, however, to provide a slight time delay and thus prevent spurious triggering.

The transistors 41 and 42 serve as a conventional two-part AND gate in that both of them must be triggered before an actuating signal is supplied to the SCR 21.

The three transistors 39 serve as a three-part NOT AND gate. That is, when all three of the transistors 39 have been triggered or are conductive—which indicates the presence of a signal from all of the three transformers 34, 35 and 36, which in turn indicates that all of the lines 3, 4 and 5 are conducting current or are operative—there will be no substantial voltage drop across the three transistors 39 and as a result the transistor 41 will not be triggered to be conductive. In effect, therefore, the three transistors 39 prevent the SCR 21 from being actuated to open the load circuit when everything is functioning normally with current being carried in all three of the lines 3, 4 and 5. Upon a failure in any one of the three lines 3—5, however, there will be a sufficient voltage drop across the set of three transistors 39 to trigger the transistor 41 and render it conductive.

The three transistors 40 together constitute a three-part OR gate. Because of the parallel connections of the three transistors 40, a trigger signal will be provided to the transistor 42 when a signal is received from any one or more of the three transformers 34, 35 or 36. The transistor 42 will not be triggered, however, when none of the three lines 3, 4 or 5 is operative.

The transistors 39, 40, 41 and 42 together constitute an exclusive OR gate. That is, the gate is conductive when any one or less than all of a number of conditions is present, but is nonconductive when none or all of the conditions exist. The "conditions" here are the state of operativeness of the three lines 3, 4 and 5 as reflected by the signal transformers 34, 35 and 36. Thus, the gate will function to allow a trigger signal to be conducted through the trigger circuit to the SCR 21 when current is being conducted in any one or two of the lines 3, 4 or 5. It will not allow such a signal, however, when current is being conducted in all or none of the three lines.

As indicated above, a phase failure serves to operate the basic circuit in the same manner as the presence of an overload, by actuating the bypass SCR 21 to short the signal to the triac 15. Resetting is accomplished in the same manner as for an overload by pressing the button 29.

A preferred embodiment of the invention has been shown and described herein, but it will be apparent that modifications in structure and context might be made without departure from the spirit of the invention. Although the phase failure protection circuit shown is particularly suited for use in combination with the basic overload protection circuit shown, it might be used with other protective circuits of any number of phases. Also, although a particularly preferred form of exclusive OR gate has been shown other means might be used to accomplish this result. Further, other sensing means might be substituted for the transformers 34, 35 and 36 although they are preferred, and other DC signal arrangements might be substituted for the preferred form shown. In view of the possible modifications, it is not intended that the invention be limited by the showing herein or in any other manner except as may specifically be required.

We claim:

1. In a protective circuit for a three phase load circuit, wherein the protected circuit includes an actuable bypass device and means to break the load circuit upon actuation of the bypass device, the combination therewith of a phase failure-responsive protection circuit, said phase failure-responsive circuit comprising:

trigger circuit means to provide an actuating signal to the bypass device; exclusive OR gate means in the trigger circuit means comprising two-part AND gate interposed in the trigger circuit means, a three-part NOT AND gate that is adapted to trigger one of the parts of the AND gate, and a three-part OR gate adapted to trigger the other part of the AND gate; and a plurality of separate signal means, one associated with each phase of the load circuit and adapted to provide a signal when the associated phase is operative, each of the respective signal means being connected to a respective part of the NOT AND gate and to a respective part of the OR gate means so that the exclusive OR gate is conductive when any one or any number less than all of the phases is operative but not when none or all of the phases is operative.